(12) United States Patent
Oberg

(10) Patent No.: US 6,733,085 B1
(45) Date of Patent: May 11, 2004

(54) TRANSFER TRAILER SYSTEMS AND METHODS FOR DUMP TRUCKS

(76) Inventor: Gordon D. Oberg, 23810 Old 99 N., Arlington, WA (US) 98223

( * ) Notice: Subject to any disclaimer, the term of this patent is extended or adjusted under 35 U.S.C. 154(b) by 0 days.

(21) Appl. No.: 09/946,608

(22) Filed: Sep. 4, 2001

Related U.S. Application Data

(63) Continuation-in-part of application No. 09/482,973, filed on Jan. 12, 2000, now Pat. No. 6,283,554.
(60) Provisional application No. 60/115,697, filed on Jan. 12, 1999.

(51) Int. Cl.$^7$ .................................................. B60P 1/16
(52) U.S. Cl. .................... 298/8 T; 298/17 S; 298/22 R
(58) Field of Search ............................ 298/8 T, 17 S, 298/17.6, 22 R; 280/508

(56) References Cited

U.S. PATENT DOCUMENTS

| | | | |
|---|---|---|---|
| 1,749,274 A | 3/1930 | Crisler | |
| 3,193,329 A | 7/1965 | Hribar et al. | 208/22 R |
| 3,361,477 A | 1/1968 | Pitts | 298/22 R |
| 3,674,312 A | 7/1972 | O-Rear | 298/8 T |
| 3,771,829 A | 11/1973 | Breazeale et al. | 298/22 R |
| 4,261,616 A | 4/1981 | Beegle | |
| 5,143,496 A | 9/1992 | Smith et al. | 298/8 T |
| 5,456,520 A | 10/1995 | Adams et al. | 298/22 R |
| 5,971,493 A | 10/1999 | Robert | 298/175 |
| 6,283,554 B1 * | 9/2001 | Oberg | 298/8 T |
| 6,336,683 B1 * | 1/2002 | Akiba | 298/8 T |

FOREIGN PATENT DOCUMENTS

SU 475334 6/1975

OTHER PUBLICATIONS

General Trailer Company advertising materials.
Reliance advertising materials.
K–Line Trailers Ltd. advertising materials.
Sturdy–Weld advertising materials.
J&J Truck Bodies advertising materials.
Columbia Body Mfg. Co. advertising materials.
Knight Trailers Company Inc. advertising materials.

* cited by examiner

Primary Examiner—Stephen T. Gordon
(74) Attorney, Agent, or Firm—Michael R. Schacht; Schacht Law Office, Inc.

(57) ABSTRACT

A dump truck system comprising a vehicle, a trailer assembly, and hitch assembly. The trailer assembly comprises a trailer frame assembly. The hitch assembly connects the support member to the vehicle. In one embodiment, the trailer assembly further comprises a support member attached to the trailer frame assembly and a suspension assembly arranged between the support member and the trailer frame assembly. The suspension assembly resiliently opposes transmission of shocks from the trailer frame assembly to the vehicle as the vehicle pulls the trailer assembly. In another embodiment, the vehicle comprises a vehicle bed having a gate assembly movable between open and closed positions, the a trailer frame assembly is operable in a selected one of a rail configuration and a notch configuration, and a trailer bed is adapted to be supported by the trailer frame assembly. The trailer assembly is operable in a tow configuration a transfer configuration. When the trailer frame is in the notch configuration, the trailer assembly may be moved from the tow configuration into the transfer configuration with the gate assembly in the closed position.

11 Claims, 8 Drawing Sheets

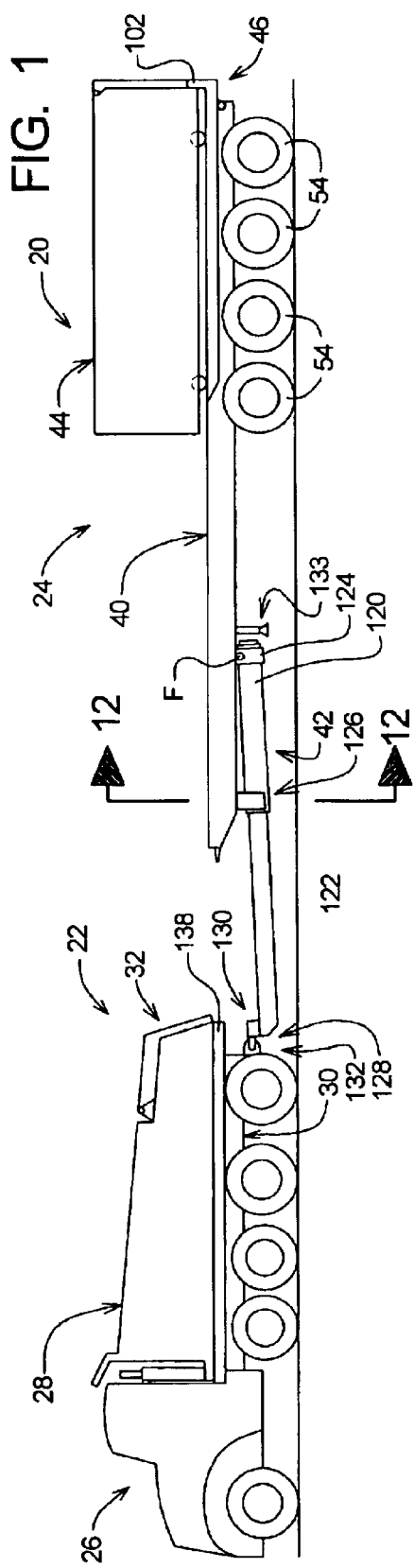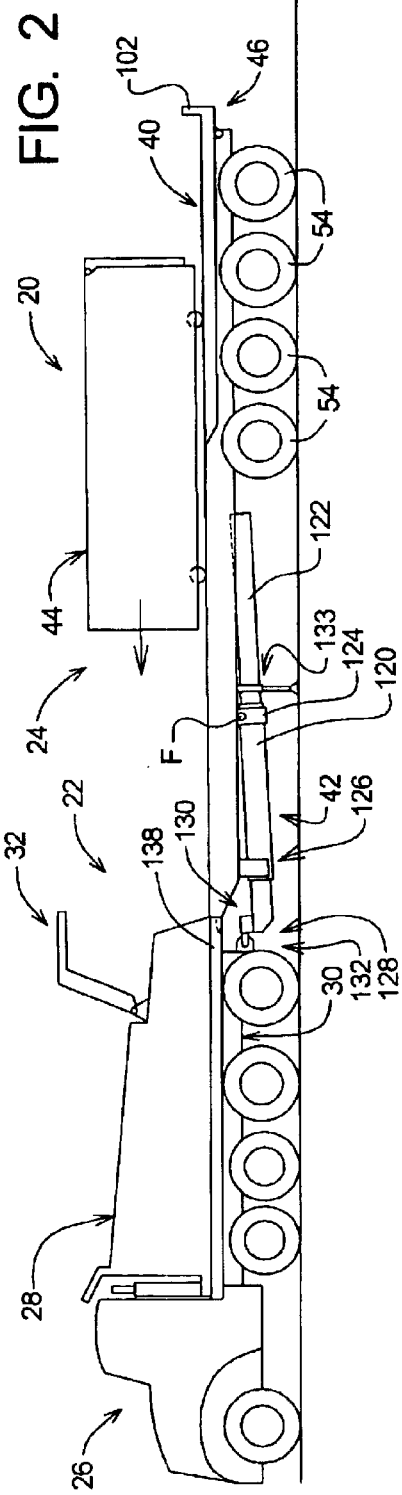

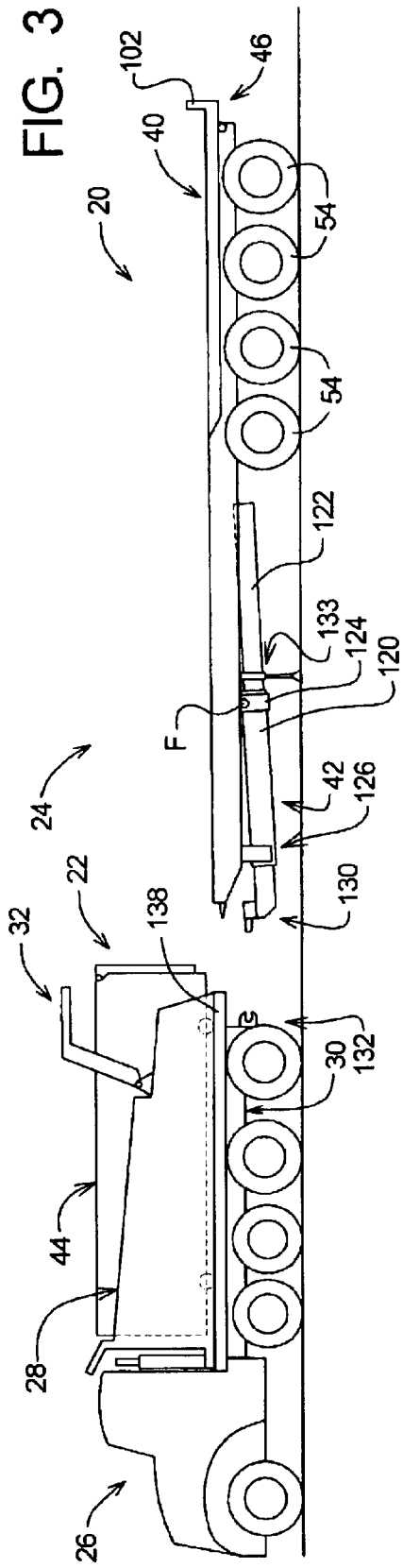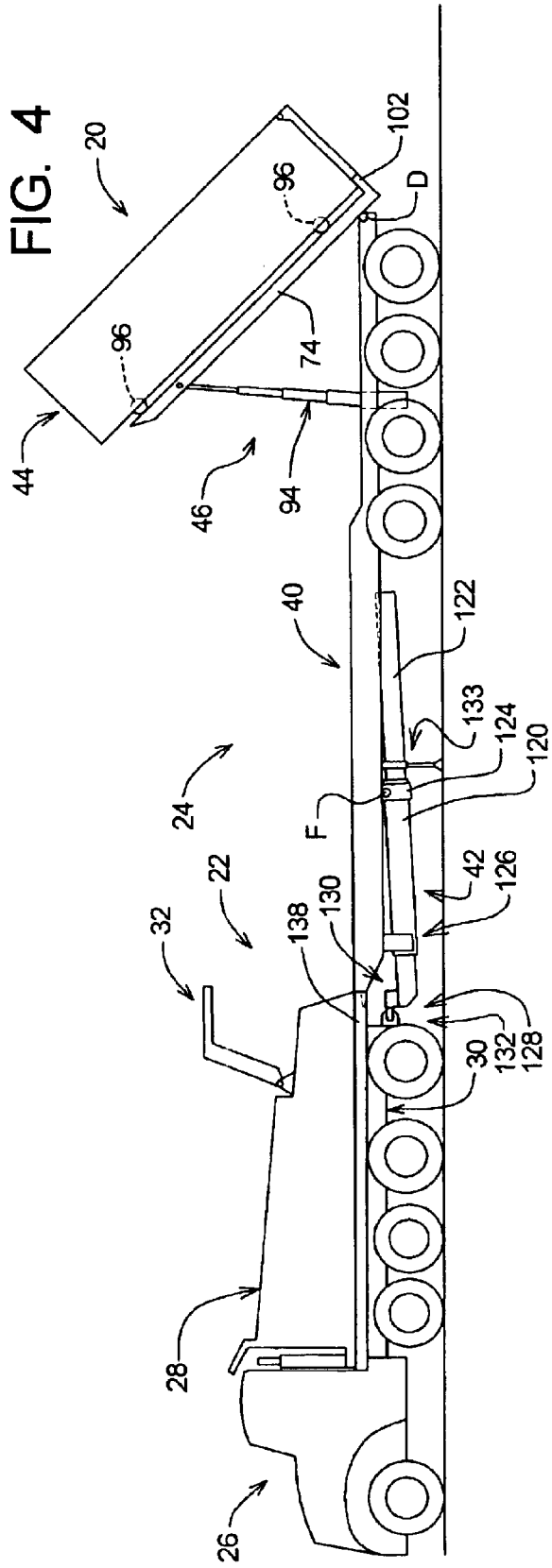

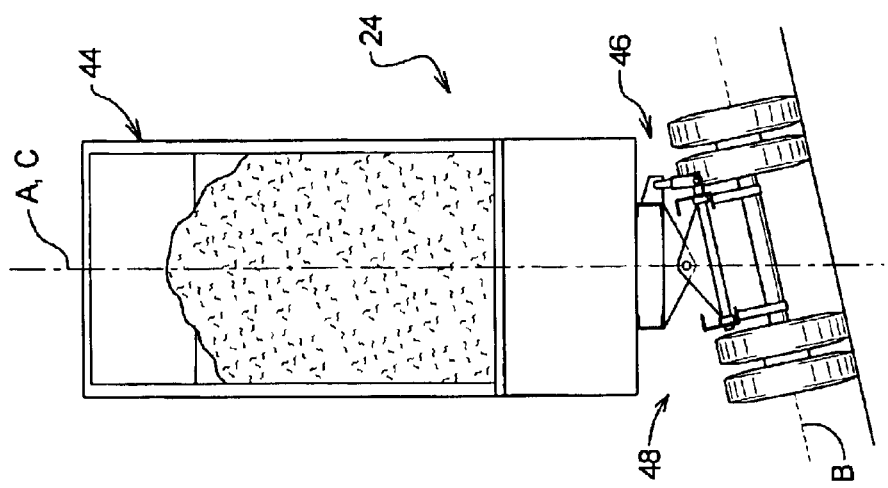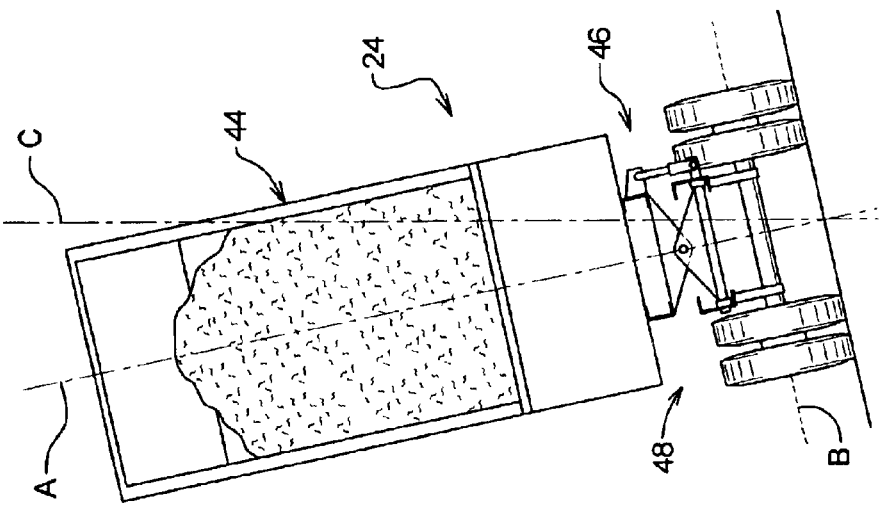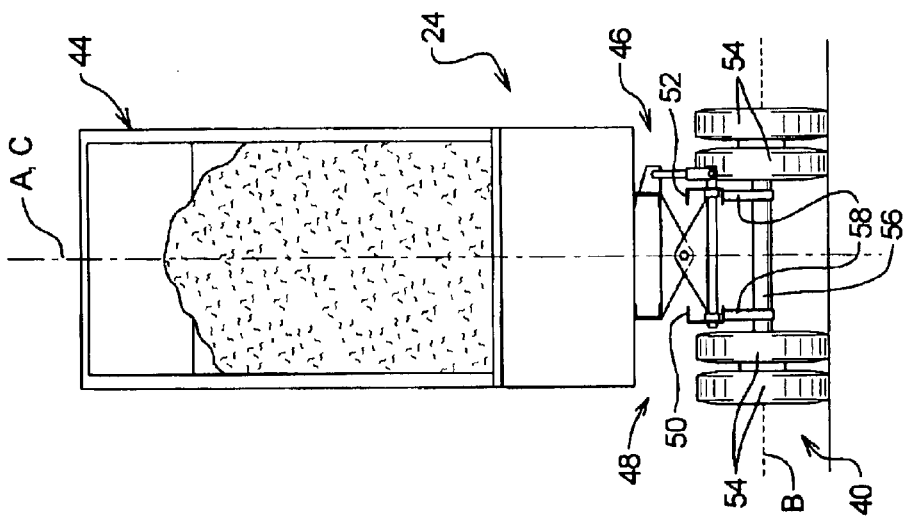

TRANSFER TRAILER SYSTEMS AND METHODS FOR DUMP TRUCKS

RELATED APPLICATIONS

This application is a continuation-in-part of U.S. patent application Ser. No. 09/482,973 filed on Jan. 12, 2000, now U.S. Pat. No. 6,283,554 B1 issued Sep. 4, 2001, which claims priority of U.S. Provisional Patent Application Ser. No. 60/115,697 filed on Jan. 12, 1999.

TECHNICAL FIELD

The present invention relates to systems and methods for loading, transporting, and dumping bulk materials and, more specifically, to such systems and methods adapted to transport bulk materials over roadways and load and dump these materials at desired locations.

BACKGROUND OF THE INVENTION

During construction projects, bulk materials such as dirt, gravel, and the like must be removed and deposited at the construction site. For example, often dirt must be removed from a site during excavation for a foundation. Gravel is then often dumped at the site and compacted to form a stable substrate for the foundation.

Conventionally, dump trucks are used to remove the dirt and deposit the gravel at the site. Dump trucks are high capacity vehicles that have a truck bed that may be tilted to dump the contents from the bed quickly and efficiently. In the example give, a loader would commonly be used to load dirt onto the truck during the excavation process. The truck will then take the dirt to a dumping location where the excavated dirt is to be deposited. The truck will then dump the excavated dirt at the dumping location. Gravel will normally be loaded onto the truck by an overhead conveyor or hopper. The truck will then take the gravel to the construction site and dump the gravel at the desired location.

To improve efficiency, dump trucks often tow a trailer that supports what will be referred to as a trailer bed. The trailer bed allows the truck to transport approximately twice the amount of dirt or gravel as a truck without a trailer bed. Conventionally, the trailer bed is loaded while on the trailer and dumped by transferring the trailer bed to the truck bed and then tilting the truck bed as described above.

The need exists for improved dump truck systems and methods that may be easily loaded and unloaded and can carry large loads during each trip.

The term "bulk material" will be used herein to refer to any material that may be loaded onto, transported by, and dumped from a dump truck of the kind to which the present invention relates. The term "desired location" will be used to refer to the precise point at which material is to be deposited, while the term "transfer site" will be used to refer more broadly to the general area surrounding the desired location.

SUMMARY OF THE INVENTION

A dump truck system comprising a vehicle, a trailer assembly, and hitch means. The trailer assembly comprises a trailer frame assembly. The hitch means connects the support member to the vehicle.

In one embodiment, the trailer assembly further comprises a support member attached to the trailer frame assembly and a suspension assembly arranged between the support member and the trailer frame assembly. The suspension assembly resiliently opposes transmission of shocks from the trailer frame assembly to the vehicle as the vehicle pulls the trailer assembly.

In another embodiment, the vehicle comprises a vehicle bed having a gate assembly movable between open and closed positions, the a trailer frame assembly is operable in a selected one of a rail configuration and a notch configuration, and a trailer bed is adapted to be supported by the trailer frame assembly. The trailer assembly is operable in a tow configuration a transfer configuration. When the trailer frame is in the notch configuration, the trailer assembly may be moved from the tow configuration into the transfer configuration with the gate assembly in the closed position

BRIEF DESCRIPTION OF THE DRAWINGS

FIGS. 1–4 are side elevation views depicting the use of the dump truck systems and methods of the present invention;

FIGS. 5–7 are rear elevation views depicting the dump truck systems and methods as depicted in FIG. 4 under various terrain conditions;

DETAILED DESCRIPTION OF THE INVENTION

Figure 8:
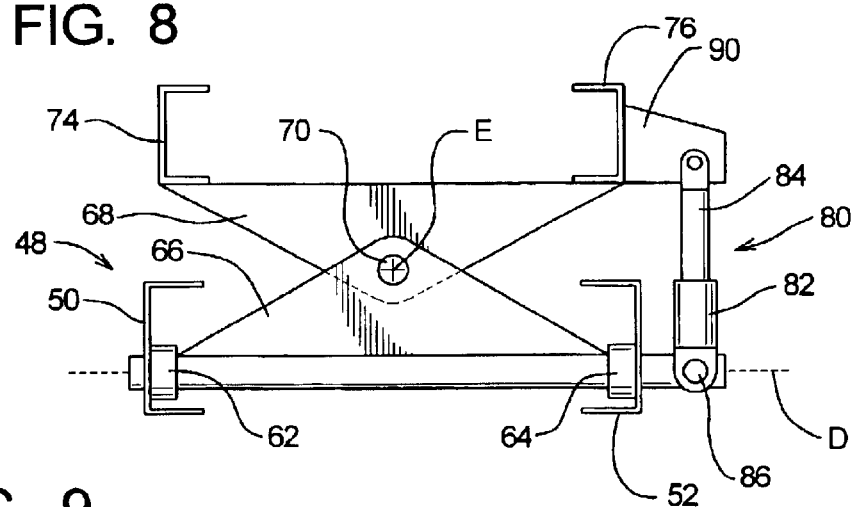
FIG. 8 is an enlarged rear elevation view depicting a leveling system that may be employed by the dump truck systems and methods of FIGS. 1–7.

Referring initially to FIGS. 1–4 of the drawing depicted at 20 therein is a dump truck system constructed in accordance with, and embodying, the principles of the present invention. These FIGS. 1–4 also depict methods of using the system 20 embodying the principles of the present invention.

The present invention is of particular significance, and that application will be described in detail herein. However, many of the features of the present invention can be applied to other types of trucks, such as logging trucks. The following discussion is thus not intended to limit the scope of the invention to only environments in which the invention is used on improved dump trucks.

The exemplary dump truck system 20 employs a dump truck 22 and a trailer assembly 24. The dump truck system 22 employs a vehicle portion 26 and a truck bed 28. The dump truck 22 is generally conventional and will be described herein only to the extent necessary for complete understanding of the present invention.

Figure 9:
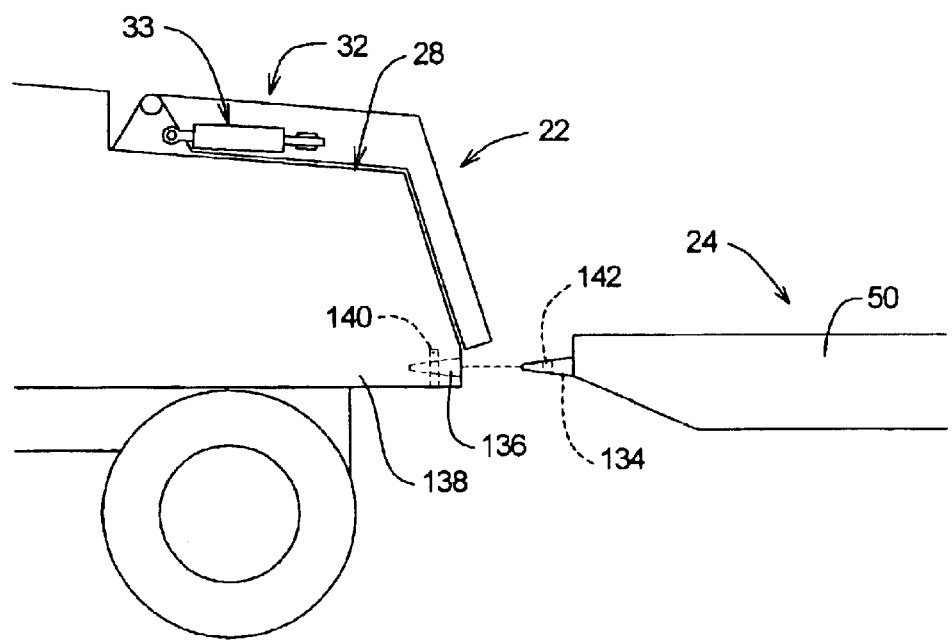
FIG. 9 is a side elevation view depicting the connection of the trailer and the dump truck as depicted in FIG. 2.

The vehicle portion 26 comprises a vehicle frame assembly 30 that supports the truck bed 28. The truck bed 28 comprises a bed gate assembly 32. The bed gate assembly 32 may be moved between a closed position (FIGS. 1 and 4) and an open position (FIGS. 2 and 3) using a gate actuator assembly 33 (FIG. 9).

The trailer assembly 24 comprises a trailer frame assembly 40, a hitch assembly 42, a trailer bed 44, a trailer dump assembly 46, and a trailer tilt assembly 48.

The dump truck system 20 may operate in any one of a number of configurations depending on the circumstances. In FIG. 1, the dump truck system 20 is shown in a transportation and loading configuration. In this first configuration, bulk material is loaded into the truck bed 28 and/or trailer bed 44. Bulk material in these beds 28 and 44 may be moved from a source point to a destination point by operation of the vehicle 26.

In FIGS. 2 and 3, the dump truck system 20 is shown in a second configuration in which the trailer bed 44 is loaded into the truck bed 28, after which the trailer assembly 24 is detached from the dump truck 22. A conventional winch system (not shown) may be used to transfer the trailer bed 44 to the truck bed. The dump truck 22 may then be used to dump material from the trailer bed 44 in a conventional manner. This second configuration would be primarily used in situations in which use of the trailer assembly 24 is not practical.

Referring now to FIG. 4, depicted therein is a third configuration in which the trailer bed 44 is dumped directly from the trailer assembly 24 using the trailer dump assembly 46. This third configuration is used in situations where the trailer assembly 24 may be maneuvered into position at the desired location where the bulk material is to be dumped. If the trailer assembly 24 can be maneuvered such that this third configuration is possible, the bulk material contained in the trailer bed 44 may be dumped more quickly and efficiently than using the second configuration described above with reference to FIGS. 2 and 3.

With the foregoing general understanding of the operation of the dump truck system 20 in mind, reference is now made to FIGS. 5–7. FIGS. 5–7 show details of operation of the trailer tilt assembly 48.

In particular, FIGS. 5 and 6 show that the trailer bed 44 defines a bed reference plane A and the trailer frame assembly 40 defines a frame reference axis B. Under most situations, the trailer bed 44 is in the down position shown in FIGS. 1–3 and the bed reference plane A is perpendicular to the trailer reference axis B.

However, FIG. 6 shows that the bed reference plane A can be substantially misaligned with a true vertical reference plane C on uneven ground. Accordingly, maintaining this perpendicular relationship between the bed reference plane A and the trailer reference axis B can cause an unstable situation on non-level ground when the trailer bed 44 is in its raised position as shown in FIG. 6.

Referring now to FIG. 7, it can be seen that on uneven ground (the trailer reference axis B is not horizontal), the trailer tilt assembly 48 is operated until the bed reference plane A is substantially parallel with the vertical reference plane C. In this case, the bed reference plane A is no longer perpendicular to the trailer reference axis B. The trailer tilt assembly 48 thus allows the trailer to be unloaded in a stable fashion on uneven ground.

Referring now to FIG. 8, the trailer tilt assembly 48 will now be described in further detail. Identified by reference characters 50 and 52 are first and second main frame members of the trailer frame assembly 40. These frame members 50 and 52 are rigid beams capable of carrying the load of the trailer bed 44 and its contents. Referring for a moment to FIG. 5, it can be seen that the main frame members 50 and 52 are supported by wheels 54 mounted on wheel axials 56 and wheel axials struts 58. The wheel axials 56 define the trailer reference axis B described above.

Referring back to FIG. 8, the dump assembly 46 comprises a dump axle 60 is mounted by dump bearings 62 and 64 to the main frame members 50 and 52. The dump axle 60 defines a dump axis D; the dump bearings 62 and 64 allow the dump axle 60 to axially rotate about the dump axis D.

The exemplary tilt assembly 48 comprises a frame flange 66, a bed flange 68, and a tilt pin 70. The frame flange 66 is rigidly attached to the dump axle 60. The frame flange 66 is connected to a bed flange 68 by a tilt pin 70. The tilt pin 70 allows the bed flange 68 to rotate about a tilt axis E relative to the frame flange 66. The bed flange 68 is in turn rigidly connected to first and second bed support members 74 and 76 that support the trailer bed 44 and its contents. The trailer bed 44 is thus supported on the trailer frame assembly 40 in a manner that lets the trailer bed 44 move in two axes of rotation; i.e., about the dump axis D and the tilt axis E relative to the trailer frame assembly 40.

The exemplary tilt axis assembly 48 further comprises a tilt actuator assembly 80 comprising an actuator housing 82 and an actuator piston 84. The actuator assembly 80 is conventional and is hydraulically operated to extend and retract the piston 84 relative to the housing 82. The housing 82 is pivotally connected to the dump axle 60 by a housing pin 86, while the actuator piston 84 is pivotally connected to a tilt flange 90 rigidly extending from the trailer bed 44. Appropriate application of hydraulic fluid to the actuator housing 82 increases and decreases the effective length of the tilt actuator assembly 80, which in turn causes the trailer be 44 to rotate about the tilt axis E as described above with reference to FIGS. 5–7.

Figure 11:
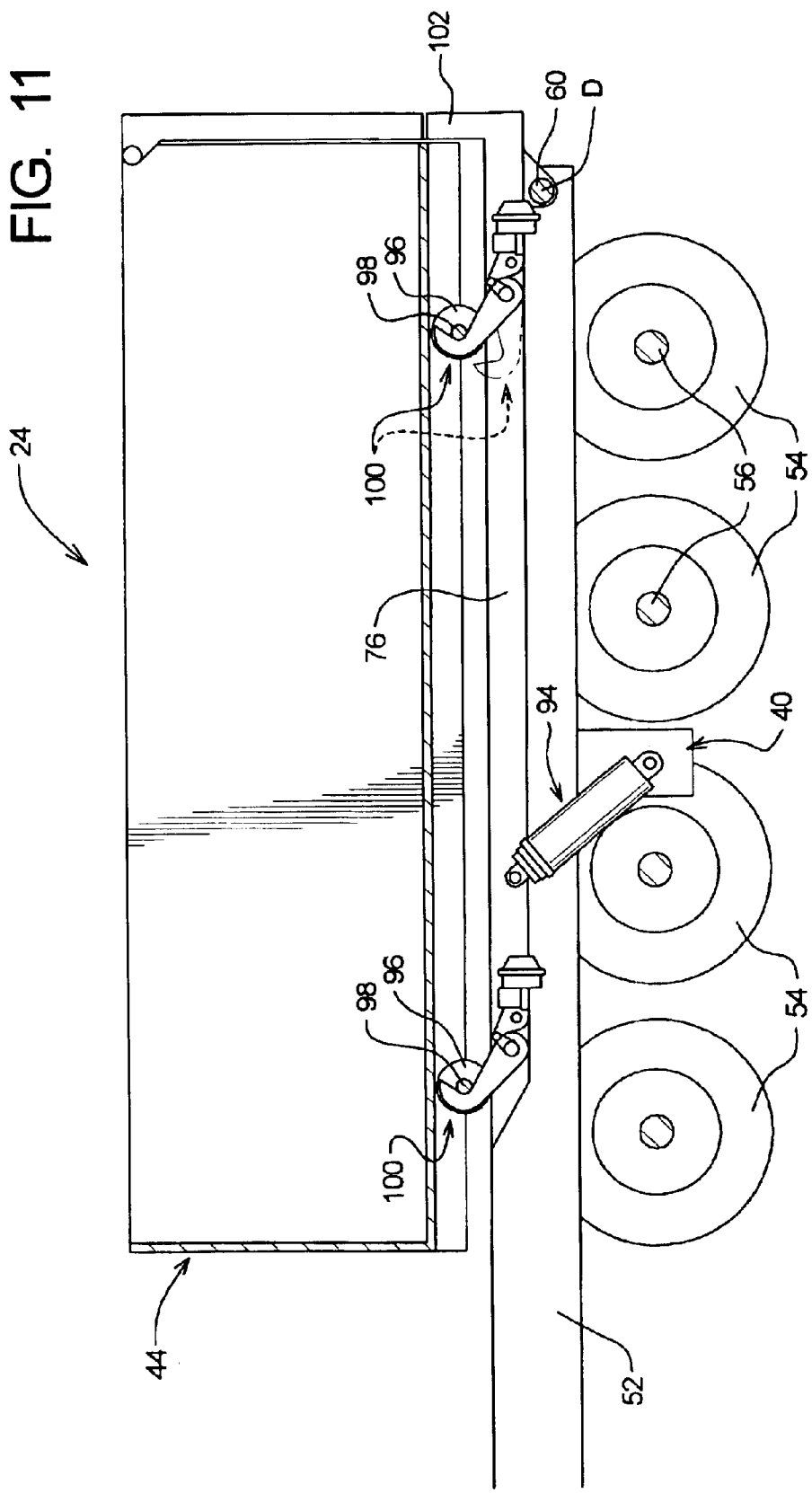
FIG. 11 is a side elevation view depicting the connection of the trailer and trailer bed of the dump truck systems and methods of FIGS. 1–7.

Referring now to FIG. 11, depicted therein is a dump actuator 94 that is pivotally connected at one end to the trailer frame assembly 40 and at another end to the trailer bed 44. The dump actuator 94 is also conventional, and appropriate application of hydraulic fluid thereto increases and/or decreases the effective length of the actuator 94 using telescoping parts (see FIG. 4). Operation of the dump actuator 94 thus allows the trailer be 44 to be rotated about the dump axis D as described above with reference to FIGS. 1–4.

FIG. 11 also depicts bed wheels 96 that are mounted to the trailer bed 44 by bed wheel axles 98. These bed wheels 96 engage the trailer frame 40 and allow the trailer bed 44 to be moved along the trailer frame 40 as depicted in FIGS. 2 and 3 above.

FIG. 11 further depicts exemplary latch assemblies 100 that may be moved between an engaged position (solid lines) in which movement of the trailer bed 44 towards the front and a disengaged position (broken lines) in which movement of the trailer bed 44 towards the front is allowed. In the engaged positions, the latch assemblies engage the bed wheel axles 98.

Extending upwardly from the trailer frame 40 are bed stops 102 that engage the trailer bed 44 to prevent the bed 44 from moving further towards the rear when the trailer bed 44 is in a storage/dump position as shown in FIGS. 1, 4, and 11.

Referring now to FIGS. 1–4, the exemplary hitch assembly 42 used by the system 20 will now be described in further detail. The hitch assembly 42 allows the trailer assembly 24 to be attached to and detached from the vehicle 26.

The hitch assembly 42 comprises a support tube 120, a slide tube 122, a support collar 124, and a suspension system 126. The support collar 124 is rigidly attached to the trailer frame 40; the support collar 124 also pivotally suspends the support tube 120 from the trailer frame 40 such that the support tube 120 rotates relative to the trailer frame 40 about a suspension axis F. The slide tube 122 is slidably supported by the support tube 120 such that the slide tube 122 moves between an extended position (FIG. 1) and a retracted position (FIGS. 2–4). The suspension system 126 is mounted between the support tube 120 and the trailer frame 40 to resiliently oppose movement of the support tube 120 towards the trailer frame 40.

A hitch assembly 128 is formed by a tongue assembly 130 and a receiver assembly 132. The tongue assembly 130 is rigidly connected to the slide tube 122, while the receiver assembly 132 is rigidly connected to the vehicle 26. The tongue assembly 130 is adapted to be detachably attached to the receiver assembly 132 in a conventional manner. The hitch assembly 128 is thus generally conventional and allows the slide tube 122 to be rigidly connected to and detached from the vehicle 26. A jack assembly 133 is rigidly connected to the trailer frame 40 to support the trailer assembly 24 when the trailer assembly 24 is detached from the vehicle 26.

Figure 10:
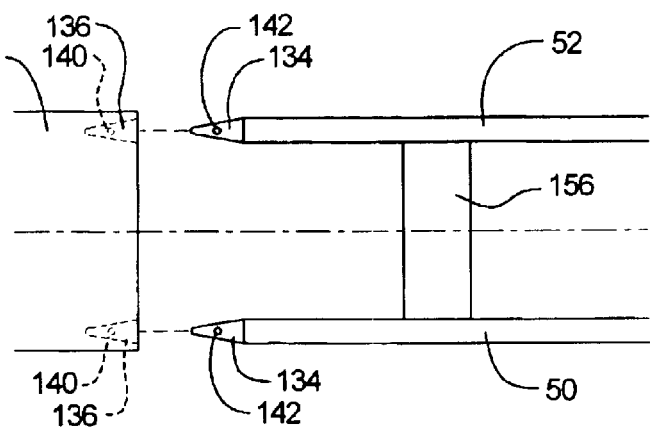
FIG. 10 is a top plan view depicting the situation shown in FIG. 9.

Referring now to FIGS. 9 and 10, depicted therein are lock projections 134 and lock cavities 136 that allow the trailer frame 40 to be directly supported by a structural portion 138 of the vehicle frame assembly 30. The lock projections 134 are formed on the main frame members 50 and 52. The lock cavities 136 are formed in the structural portion 136 of the trailer frame 40. The lock cavities 136 are sized and dimensioned to snugly receive the lock projections 134 such that movement of the main frame members 50 and 52 up, down, sideways, or towards the vehicle 26 is substantially prevented. Optionally, lock pins 140 may be passed through lock holes 142 in the lock projections 134 to prevent withdrawal of the lock projections 134 from the lock cavities 136 under normal use.

The lock projections 134 and lock cavities 136 allow the trailer assembly 24 to be secured to the vehicle assembly 26 during the second and third configurations of used shown in FIGS. 2–4.

Figure 12:
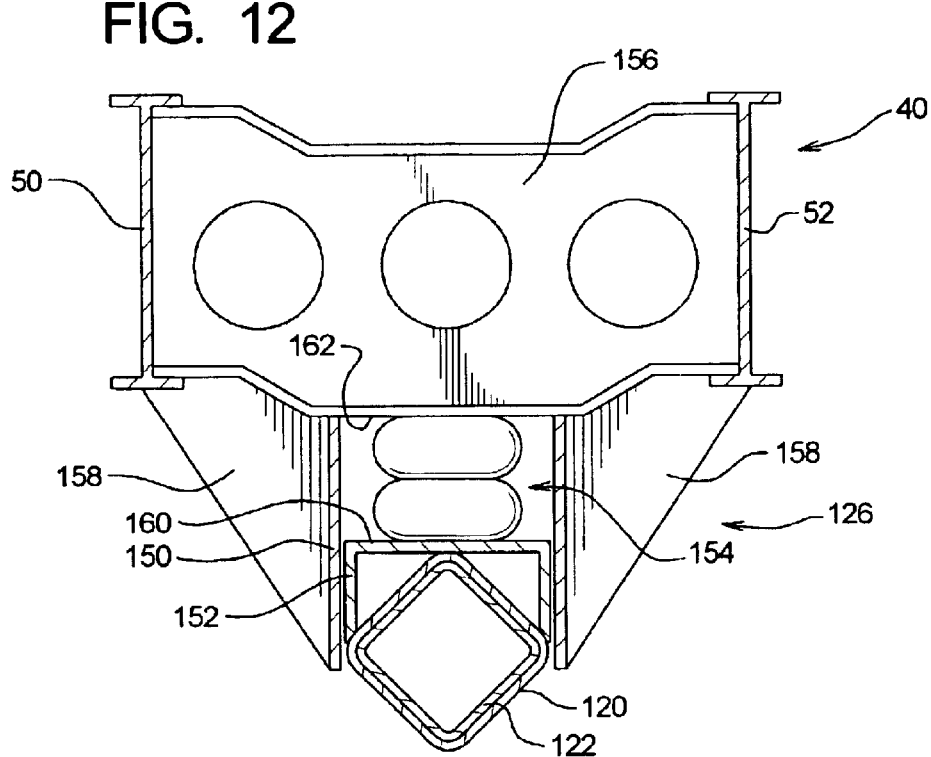
FIG. 12 is a section view taken along lines 12—12 in FIG. 1 depicting a suspension system that may be employed by the dump truck systems and methods of FIGS. 1–7.
Figure 13:
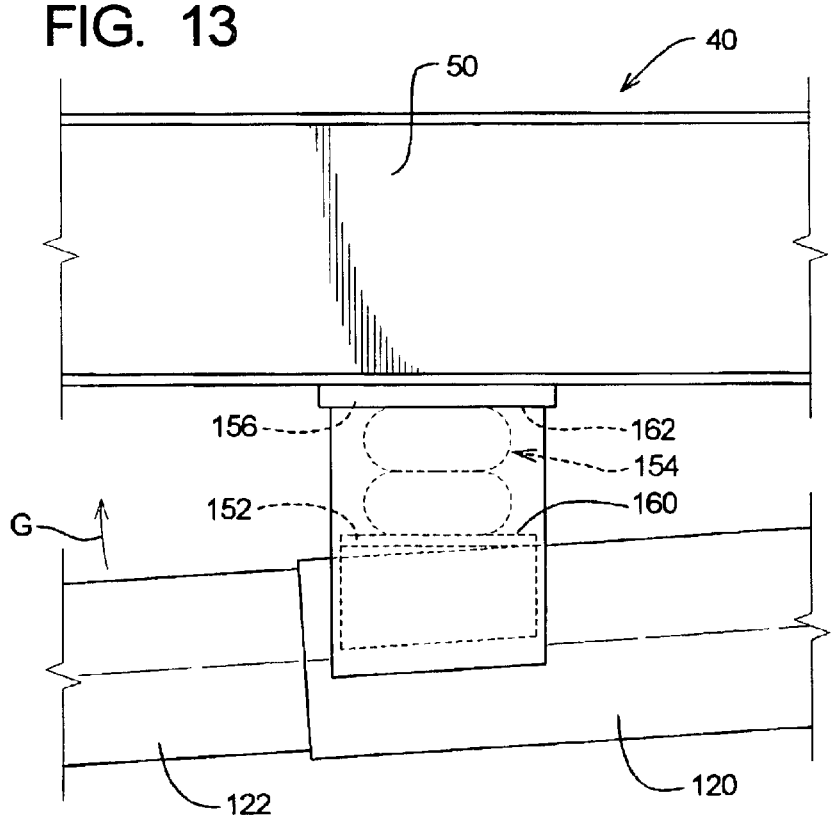
FIG. 13 is a side elevation view depicting details of the suspension system of FIG. 12.

Referring now to FIGS. 12 and 13, the optional suspension system 126 will now be described in further detail. The suspension system 126 comprises a suspension housing 150, a suspension bracket 152, and an air bag system 154. The suspension housing 150 is rigidly connected to a cross member 156 that extends between the main frame members 50 and 52 and forms a part of the trailer frame assembly 40. Brace members 158 further rigidly connect the suspension housing 150 to the trailer frame 40.

The suspension bracket 152 is rigidly attached to the support tube 120 such that the bracket 152 is substantially contained within the suspension housing 150 with a bracket surface 160 on the suspension bracket 152 facing a housing surface 162 on the cross member 156. The air bag system 154 is contained within the suspension housing 150 between the bracket surface 160 and the housing surface 162.

The air bag system 154 is conventional and, when inflated, resiliently opposes movement of the bracket surface 160 towards the housing surface 162. As described above, the support tube 120 is pivotally connected to the trailer frame 40 by the support collar 124. This pivotal connection allows the support tube 120 to pivot in the direction shown by arrow G in FIG. 13 relative to the trailer frame 40. The air bag system 154 will resiliently oppose movement in the direction shown by arrow G.

Accordingly, in the first configuration shown in FIG. 1, with the slide tube 122 in the extended position and the trailer assembly 24 connected to the vehicle 26, the suspension system 126 will inhibit transmission of shocks from the moving trailer assembly 24 to the vehicle 26. The air bag system 154 may be inflated and/or deflated in the second and third configurations shown in FIGS. 2–4 as necessary to facilitate connection of the tongue assembly 128 to the hitch assembly 130 and/or insertion of the lock projections 134 into the lock cavities 136.

Referring now to FIGS. 14–19, discussed with reference thereto is a notched rail system 220 constructed in accordance with, and embodying, the principles of the present invention. The notched rail system 220 may be used as part of the transfer trailer system described above with reference to FIGS. 1–13. The notched rail system 220 may, however, be used with conventional transfer trailer systems.

Figure 15:
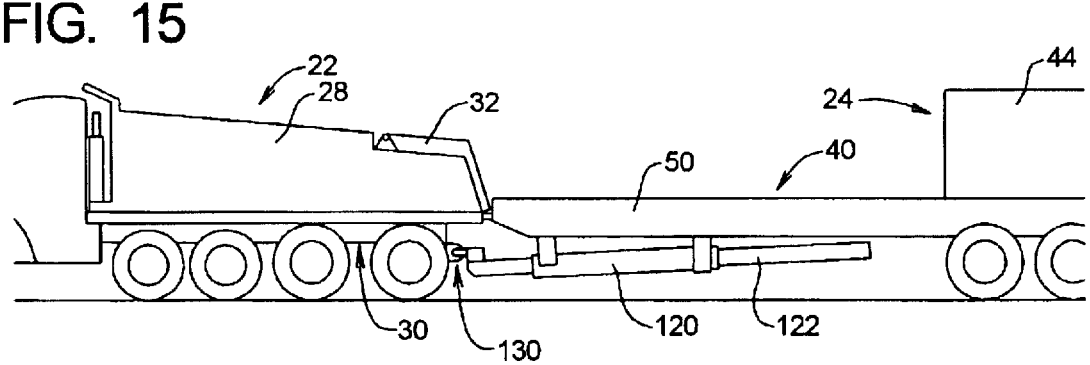
FIG. 15 is a somewhat schematic side elevation view depicting a problem associated with connected transfer trailers to dump trucks.

Referring initially to FIG. 15, depicted therein is a typical situation in which a transfer trailer is used in a manner that results in damage to a dump truck. In particular, the exemplary trailer assembly 24 described above is arranged with its trailer frame assembly 40 at a fixed location. The dump truck 22, still hitched to the trailer assembly 24 by the hitch assembly 130, is backing up to allow the 134 of the trailer assembly 24 to engage the point cavities 136 of the dump truck 22 and thereby allow the trailer bed 44 to be transferred into the truck bed 28. The exemplary trailer assembly 24 comprises the support tube 120 and slide tube 122, but a trailer assembly not including the tubes 120 and 122 would pose the same problems.

In particular, the bed gate assembly 32 of the truck bed 28 is in a closed configuration. As the truck 22 is backed up towards the trailer assembly 24, the main frame members 50 and 52 of the trailer frame assembly 40 engage the closed bed gate assembly 32 before the points 134 enter the point cavities 136. This situation frequently results in the severe damage to the bed gate assembly 32 requiring repair and down time of the truck 22.

Figure 16:
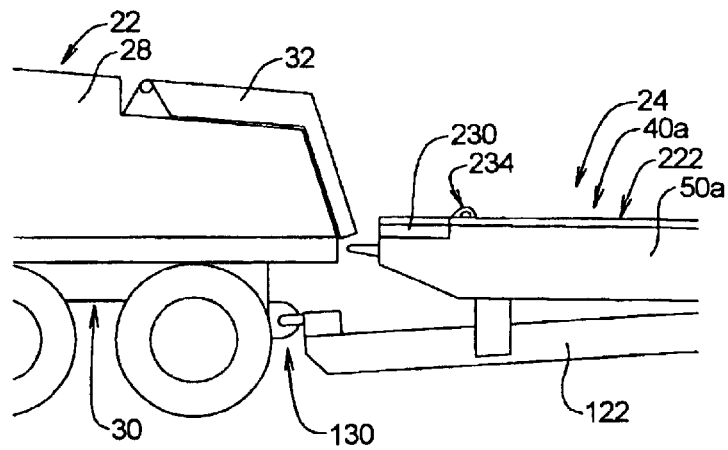
FIG. 16 is a somewhat schematic side elevation view of a transfer trailer assembly employing a notch rail system as depicted in FIG. 14 in a pretransferred configuration.
Figure 17:
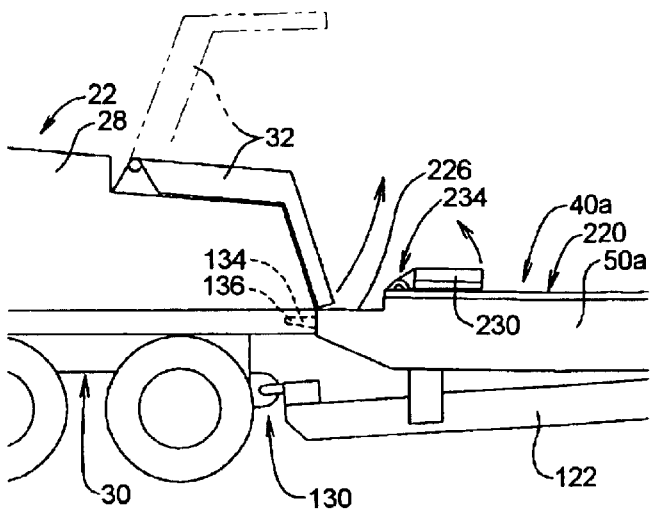
FIG. 17 is similar to FIG. 16 but shows the notch rail system of FIG. 1 in a second position that allows a bed gate assembly to move between open and closed positions with the trailer assembly in its transfer configuration.
Figure 18:
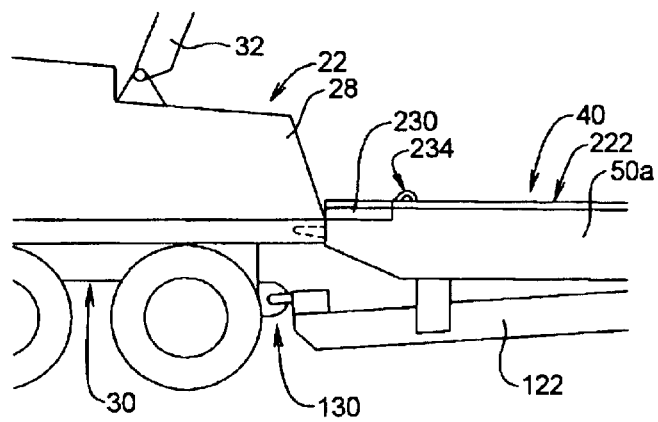
FIG. 18 shows the trailer assembly in a transfer configuration with the notch rail system in a first position that allows the transfer trailer to be moved into a bed of the dump truck.

Referring now for a moment to FIG. 16, the trailer frame assembly 40 thereof differs slightly from the trailer frame assembly 40 described above. In particular, the first and second main frame members 50a and 52a of the trailer frame assembly 40a are modified as will now be described. In particular, the main frame members 50 and 52 define first and second rail surfaces 222 and 224, respectively, along which the trailer bed 44 moves as it transfers between the trailer assembly 24 and the truck bed 28. Notches 226 and 228 (FIGS. 14 and 17) are formed in the rail members 50a and 52a. These notches form discontinuities in the rail surfaces 222 and 224 but, as shown in FIG. 17, allow the bed gate assembly 32 to move between open (broken lines) and closed (closed lines) positions.

The notched rail system 220 further comprises first and second rail segments 230 and 232. These rail segments 230 and 232 are connected to the main frame members 50a and 52a by first and second connecting assemblies 234 and 236. The connecting assemblies 234 and 236 allow the rail segments 230 and 232 to rotate between first (FIG. 18) and second (FIG. 17) positions such that the trailer frame assembly may exist in either a rail configuration corresponding to the first position or a notch configuration corresponding to the second position.

In the rail configuration, the notches 226 and 228 are filled by the rail segments 230 and 232, which form portions of the rail surfaces 222 and 224. The trailer bed 44 may thus move along the trailer frame assembly 40a in a conventional manner between the trailer assembly 24 and the truck bed 28. However, when the trailer frame assembly 40a is in the notch configuration, the notches 226 and 228 are exposed so that the bed gate assembly 32 may move between the open and closed positions without obstruction.

In use, the trailer assembly may operate in a tow configuration in which the trailer frame assembly 40a is spaced away from a vehicle frame assembly 30 of the dump truck 22. When transfer of the trailer bed 44 from the trailer assembly 24 to the truck bed 28 is desired, the trailer assembly 24 is parked and placed in a pretransfer position somewhere between the tow configuration and the situation depicted in FIG. 16. At this point, the rail segments 230 and 232 are placed in the second position, thereby placing the trailer frame assembly 40a in the notch configuration, and the truck 22 backed up such that the trailer assembly 40 is in the transfer configuration shown in FIGS. 17 and 18.

At this point, the bed gate assembly 32 may be in the open configuration, in which case the rail segments 230 and 232 are simply moved into the first position, thereby placing the trailer frame assembly 40 in its rail configuration. If the bed gate assembly 32 is closed, it is opened prior to movement of the rail segments 230 and 232 into the first position.

After the transfer has been made in either direction, the rail segments 230 and 232 may be moved back into the second position such that the trailer frame assembly 40a is in the notched configuration.

With the notched rail system 220 as described above, the first and second rail segments 230 and 232 are normally left in their second position such that the trailer frame assembly 40a is in the notched configuration. In the exemplary system 220, the rail segments 230 and 232 block the rail surfaces 220 and 222 when in the second position to ensure that the trailer bed 44 cannot move across the notches 226 and 228.

In addition, with the trailer frame assembly 40a in its notch configuration, the trailer assembly 40a may also be placed into and out of the tow and transfer configurations without damage to the bed gate assembly 32. Only when the trailer bed 44 is to be transferred between the trailer assembly 24 and the truck bed 28 is the trailer frame assembly 40a placed in its rail configuration. Interlocks may be provided to prevent movement of the truck 22 towards the trailer assembly 24 when the trailer frame assembly 40a is in the rail configuration.

The notched rail system 220 described herein thus significantly minimizes the chance that damage will occur to the bed gate assembly 32 as generally described above.

Figure 14:
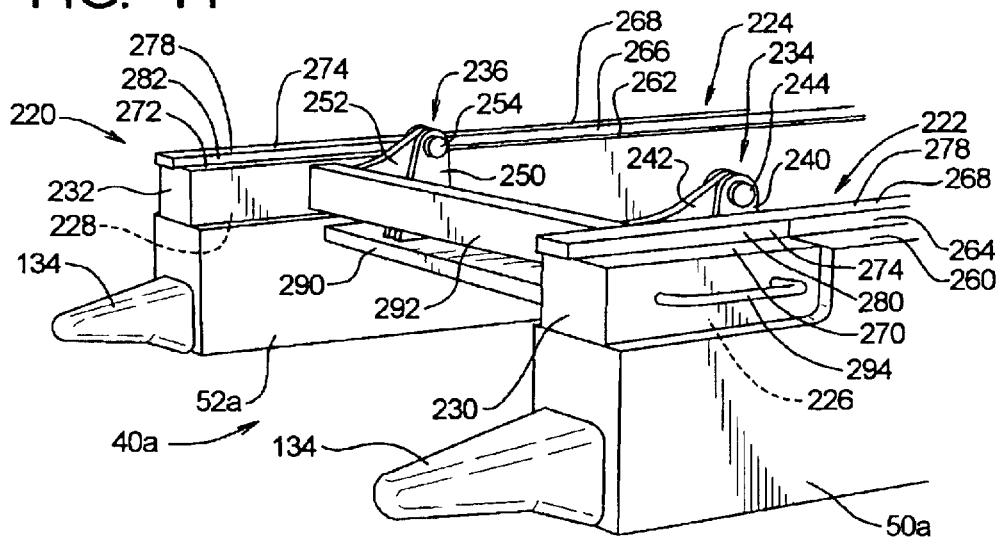
FIG. 14 is a perspective view of a notched rail system that may be used on a transfer trailer system.
Figure 19:
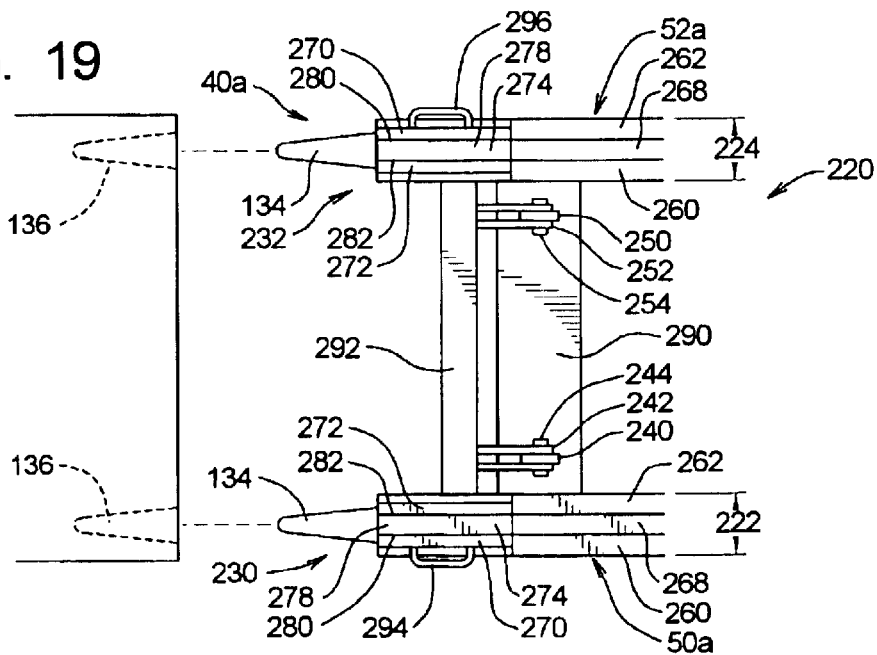
FIG. 19 is a somewhat schematic top plan view depicting the transfer trailer in the pretransferred configuration showing FIG. 16.

Referring now to FIGS. 14 and 19, the details of construction of the exemplary notch rail system 220 will now be described in further detail. Initially, these figures show that the first connecting assembly comprises a first hinge flange 240, a first stand off member 242, and a first hinge pin 244. The hinge pin 244 is inserted through the flange 240 and stand off member 242 to allow the stand off member 242 to rotate relative to the hinge flange 240. The hinge flange 240 is secured relative to the trailer frame assembly 40a, as will be described in detail below.

The stand off member 242 is rigidly connected to the first stand off member 242. The geometry of the hinge flange 240 and stand off member 242 is such that the first rail segment 230 is snugly received by the notch 226 in the first position but can rotate out of the first position into the second position with the rail segment 230 on the first rail surface 222 of the first main frame member 50a. The second connecting assembly 236 similarly comprises a second hinge flange 250, a second stand off member 252, and a second hinge pin 254. The second connecting assembly 236 is similar in all respect to the first connecting assembly 234.

Referring now for a moment to the rail surfaces 222 and 224, these are similar and only the first rail surface 22 will be described in detail herein. As shown in FIGS. 14 and 19, the rail surface a 222 comprises a first bearing portion 260, a second bearing portion 262, a first guide portion 264, a second guide portion 266, and a top portion 268. In practice, wheels 96 of the trailer bed 44 move along one or all of the bearing portions 262 and top portion 268 and are guided by one or both of the guide portions 264 and 266.

The exemplary rail segments 230 and 232 are identical, and only the first rail segment 230 will be described herein. The first rail segment defines an outer top surface 270 and an inner top surface 272 and comprises a guide portion 274. The guide portion 274 in turn comprises a top surface 278, an outer side surface 280, and inner side surface 282.

The surfaces 270, 272, 278, 280, and 282 of the rail segment 230 correspond to the first bearing portion 260, second bearing portion 262, top portion 268, first guide portion 264, and second guide portion 266 of the rail surface 22, respectively. In use, the rail segments 230 and 232, when in the first position shown in FIG. 18, form a portion of the rail surfaces 222 and 224 such that these rail surfaces 222 and 224 are substantially continuous along their length.

Referring again for a moment to FIGS. 14 and 19, depicted therein is a support plate 290 that extends between the first and second main frame members 50a and 52a of the trailer frame assembly 40a. The first and second hinge flanges 240 and 250 are rigidly mounted on the support plate between the frame members 50a and 52a. In addition, in the exemplary notch rail system 220 a connected bar 292 extends between the first and second rail systems 230 and 232. The stand off members 242 and 252 are rigidly connected to the connecting bar 292 such that the first and second connecting assemblies 234 and 236 are connected to the first and second rail segments 230 and 232 through the connecting bar 292.

In addition, as shown in FIG. 19, first and second handles 294 and 296 are attached at a convenient location on the first and second rail segments 230 and 232 such that the user may grasp one of the handles 294 and 296 and move the first and second rail segments 230 and 232 in tandem between the first and second positions.

The notch rail system 220 may be constructed and operated in a manner different from that described above and still be within the principals of the present invention. In particular, the details of the notches 226 and 228, rail segments 230 and 232, and first and second connecting assemblies 234 and 236 may be changed to accommodate a different trailer frame assembly and vehicle frame assembly.

From the foregoing, it should be apparent that the present invention may be embodied in forms other than those described above. The scope of the present invention should thus be determined by the following claims and not the foregoing detailed description.

I claim:

1. A dump truck system comprising:

a vehicle;

a trailer assembly comprising
- a trailer frame assembly,
- a support member attached to the trailer frame assembly, and
- a suspension assembly arranged between the support member and the trailer frame assembly; and hitch means for connecting the support member to the vehicle; wherein the suspension assembly resiliently opposes transmission of shocks from the trailer frame assembly to the vehicle as the vehicle pulls the trailer assembly.

2. A dump truck system as recited in claim 1, in which the support member is pivotably attached to the trailer frame assembly for rotation about a suspension axis, where the suspension assembly is adapted to resiliently oppose movement of the support member about the suspension axis.

3. A dump truck system as recited in claim 1, in which:

the support member is a support tube;

the trailer assembly further comprises a slide tube member that extends through and is supported by the support tube such that the slide tube member moves relative to the support tube between a retracted position and an extended position; and the hitch means attaches the slide tube member to the vehicle.

4. A dump truck system as recited in claim 2, in which:

the support member is a support tube;

the trailer assembly further comprises a slide tube member that extends through and is supported by the support tube such that the slide tube member moves relative to the support tube between a retracted position and an extended position; and the hitch means attaches the slide tube member to the vehicle.

5. A dump truck system as recited in claim 1, in which:

the vehicle comprises a vehicle bed;

the trailer assembly further comprises a trailer bed; and the trailer assembly is operable in
- a tow configuration in which the trailer assembly does not engage the vehicle, and
- a transfer configuration in which the trailer assembly engages the vehicle to allow the trailer bed to move from the trailer assembly to the vehicle bed.

6. A dump truck system as recited in claim 5, in which:

the vehicle bed comprises a gate assembly movable between open and closed positions;

the trailer frame assembly exists in one of a rail configuration and a notch configuration; and when the trailer frame assembly is in the notch configuration, the trailer assembly may be moved from the tow configuration into the transfer configuration with the gate assembly in the closed position.

7. A dump truck system as recited in claim 6, in which the trailer frame assembly comprises:

first and second main frame members defining first and second rail surfaces, respectively, where the main frame members engage the vehicle when the trailer assembly is in the transfer configuration; and first and second rail segments movably mounted on the first and second main frame members, respectively, between first and second positions; wherein the trailer frame assembly is in the rail configuration when the first and second rail segments are in the first position; and the trailer frame assembly is in the notch configuration when the first and second rail segments are in the second position.

8. A dump truck system as recited in claim 7, in which, when the first and second rail segments are in the first position, the rail segments define a portion of the first and second rail surfaces, respectively.

9. A dump truck system as recited in claim 7, in which the first and second rail segments are rotatably mounted on the first and second frame members, respectively.

10. A dump truck system as recited in claim 7, in which the trailer frame assembly further comprises a connecting bar extending between the first and second rail segments such that movement of one of the first and second rail segments between the first and second positions causes movement of the other of the first and second rail segments between the first and second positions.

11. A dump truck system as recited in claim 7, further comprising first and second handles attached to the first and second rail segments to facilitate movement of the rail segments between the first and second positions.

* * * * *